Feb. 10, 1959  K. C. ALLEN  2,873,416
WEIGHING SCALE ADAPTED SERVOMOTOR SYSTEM
Filed March 5, 1956
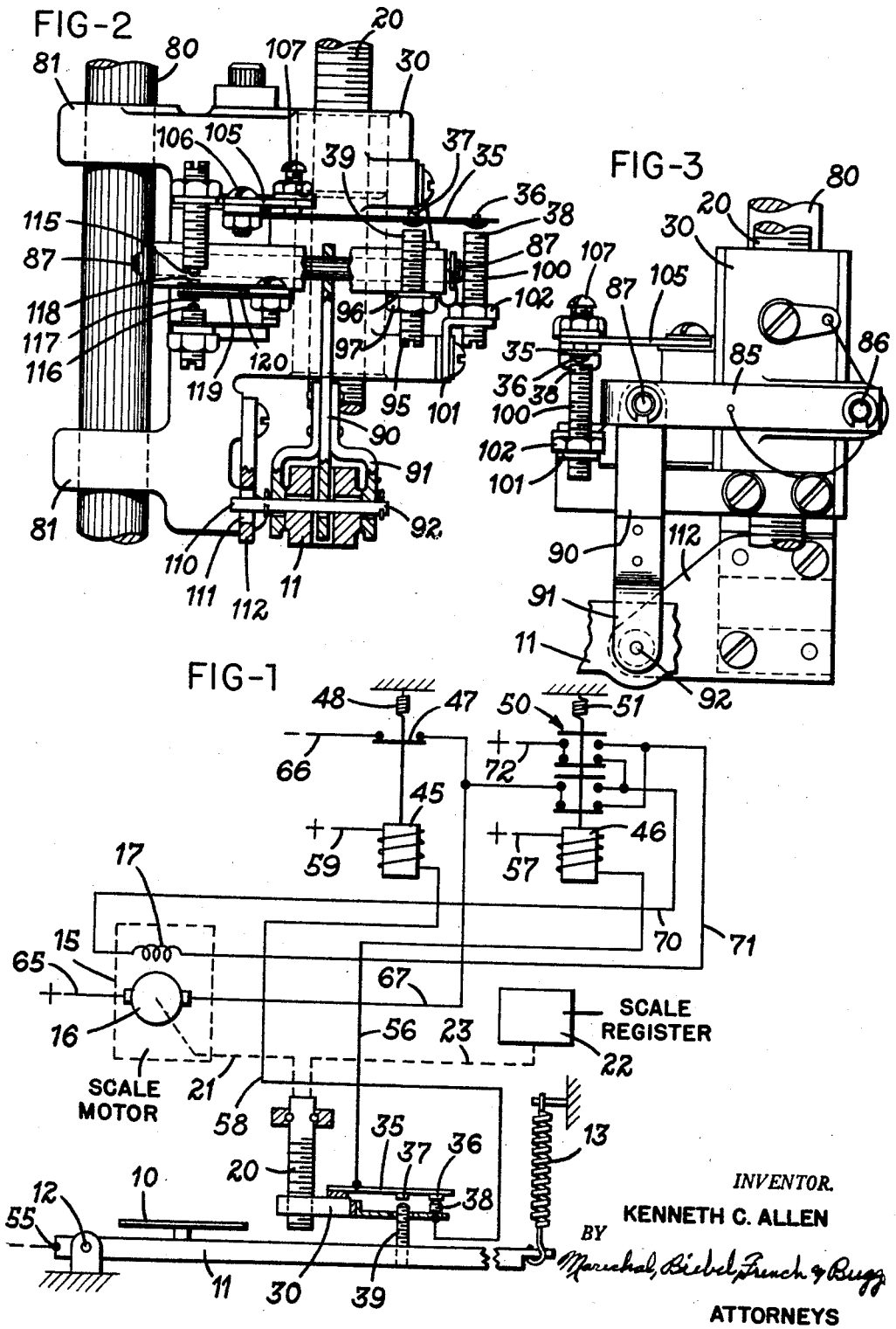
INVENTOR.
KENNETH C. ALLEN
BY
*Marechal, Biebel, French & Bugg*
ATTORNEYS

United States Patent Office 2,873,416
Patented Feb. 10, 1959

2,873,416

WEIGHING SCALE ADAPTED SERVOMOTOR SYSTEM

Kenneth C. Allen, Dayton, Ohio, assignor to The Hobart Manufacturing Company, Troy, Ohio, a corporation of Ohio Application March 5, 1956, Serial No. 569,448

10 Claims. (Cl. 318—31)

This invention relates to weighing scales and, more particularly, to automatic position sensing and follow-up means for sensing the position of the scale pan or weighing platform and actuating a weight indicator to register the weight corresponding to the position of the pan or platform.

One object of this invention is to provide a power operated position sensing device adapted to sense quickly and accurately the position of a movable member such as the weighing pan or platform of a weighing scale and actuate an indicator to register a weight or other indication corresponding to the position of the movable member.

Another object is to provide a position sensing and control mechanism of the character described which will hunt for and sense through a range of limited movement the position of a movable member with a minimum of overrun and transmit the position of the movable member to an indicating, control, or other working element, while establishing a stable dwell or balance point at the position of the movable member.

A further object of this invention is to provide an automatic follow-up position sensing device of the character described which will hunt for a moving cooperating element through either of two directions along a predetermined path and will bring itself automatically into a predetermined relative position and stable dwell with the moving element.

Still another object of this invention is to provide a power operated position sensing and control device which provides a controlled output of mechanical or electrical energy proportional and corresponding to the movement and position of the device along a predetermined path adapted for the calibrated operation of an indicating, controlling, or other working element, and with means for providing a stable dwell which unavoidable dimensional variations neither extend nor reduce to zero.

A still further object of this invention is to provide a position sensing and control device of the character described adapted particularly for use in sensing the position of the weight deflected pan or platform of a weighing scale and automatically actuating the weight indicating means of the scale to register the weight corresponding to the weighing pan or platform yet without interposing frictional, drag, or other disruptive forces in the scale weighing or balancing lever system.

Still another object of this invention is to provide a weighing scale sensing and control mechanism in a power operated scale for controlling the operation of the main scale motor in either of two directions to follow movement of the scale weighing pan or platform and to stop the motor with a minimum of overrun and back-and-forth hunting at a point corresponding to the deflection of the weighing pan or platform caused by the weight of an object being weighed thereon.

Other objects and advantages of this invention will be apparent from the following description, the accompanying drawings and the appended claims.

In the drawing,

Fig. 1 is a diagrammatic representation of the positioning sensing and control circuits and mechanism of a weighing scale embodying this invention;

Fig. 2 is a side elevation with some parts broken away of position sensing mechanism embodying this invention; and Fig. 3 is an end elevation of the mechanism of Fig. 2.

Referring to the drawing, in which like reference characters designate like parts throughout the several views, a part of the electrical circuits and position sensing mechanism is diagrammatically illustrated in Fig. 1 for a power operated weighing scale such as that disclosed, for example, in the copending application of Kenneth C. Allen, Serial No. 376,136, filed August 24, 1953. The scale pan or weighing platform is diagrammatically indicated at 10 for receiving an object to be weighed. Platform 10 is mounted on the main scale lever 11 shown as pivotally mounted at 12 adjacent one of its ends and resiliently supported at the opposite end by spring 13. As will be understood, the placing of an object to be weighed on platform 10 will cause main lever 11 to be depressed about its pivot 12 with concomitant extension of spring 13 until the force of extended spring 13, acting through lever 11, equals the weight of the object on weighing platform 10. Also, in a manner well known in this art, the foregoing lever and spring weighing mechanism is so constructed that the extent of movement of lever 11 is proportional to the weight of an object to be weighed placed on platform 10, so that lever 11 will come to rest in a position which can be calibrated to correspond to and indicate the weight of an object on platform 10.

The power operated weighing scale, in connection with which a device embodying the invention is here illustrated, has a main scale motor indicated at 15, including an armature indicated at 16 and field windings indicated at 17. Motor 15 drives an elongated lead screw 20 for the position sensing device, as described more in detail hereinafter, through a mechanical drive indicated by the dotted line 21, and also drives the weight indicating or registering mechanism 22, either directly or from screw 20, as indicated by the dotted line 23. Such indicating or registering mechanism 22 may be, as will be understood, indicating mechanism for indicating the weight, price per pound, cost, etc. of the object being weighed, or may include control or registering mechanism for actuating a label printer, computer or other indicating, controlling, or working element as desired in accordance with the position of pan 10 or lever 11.

The mechanism for sensing the position of main lever 11, as determined or deflected by the weight or weighing pan 10, includes a carriage 30, diagrammatically indicated in Fig. 1 and in more detail in Figs. 2 and 3, threadably engaged with screw 20 to be raised or lowered as screw 20 is rotatably driven by motor 15 through drive 21. Carriage 30 carries a resilient switch arm 35 on which are two electrical contacts 36 and 37. Carriage 30 also carries a fixed electrical contact 38 for engagement with contact 36, and a movable contact 39 is provided for engagement with contact 37 and movable in response to the vertical movement of lever 11.

Two electrical relays 45 and 46 are also provided with relay 45 controlling a switch 47 to maintain the switch in open position whenever relay 45 is energized. Switch 47, however, is biased into closed position, as by a spring 48, so that switch 47 will be closed at all times when relay 45 is de-energized. Relay 46 controls a reversing switch indicated generally at 50 which reverses in its two positions the field windings 17 of motor 15 in order to reverse the direction of rotation of motor 15. As indicated by a spring 51, reversing switch 50 is biased into one position (shown as a raised position in Fig. 1) and remains in this position whenever relay 46 is de-energized. Upon the energization of relay 46, reversing switch 50 is moved to the lower position in Fig. 1 to reverse the field and rotation of motor 15.

Still referring to Fig. 1, the electrical circuits there diagrammed will now be explained. One side of an electric power source is connected to main lever 11 as indicated at 55 and, through lever 11, to contact 39. Upon the closing of contacts 37 and 39, the circuit leads through resilient arm 35 to contact 36 and, as indicated by the line 56, to one side of relay 46, the other side of which is connected to the opposite side of the source of power as indicated at 57. Also when both sets of contacts 37—39 and 36—38 are closed, the circuit leads from one side of the source of power at 55 through main lever 11, contacts 37 and 39, resilient arm 35, contacts 36 and 38, to one side of relay 45 as indicated by the line 58. The other side of relay 45 is connected to the other side of the electric power source as indicated at 59. The foregoing circuits, it will be understood, may be considered as the control circuits, and the power carried thereby will be only such as is necessary to operate relays 45 and 46.

In addition to these relay control circuits, as indicated in Fig. 1, circuits for driving the reversible motor 15 are provided. Such circuits include the connection of the motor armature 16 to one side of an electric source of power as indicated at 65 and to the other side of the power source at 66 as indicated by the line 67, with the interposition of switch 47 in this circuit. The field windings 17 of motor 15 are connected to the power source as indicated by lines 70 and 71 through reversing switch 50 which, in its upper position as shown, connects line 70 with one side of the power source indicated at 72 and line 71 with the other side of the power source at 66. As will be understood, the lower position of reversing switch 50 reverses the field of motor 15 by connecting line 70 with side 66 of the main power source and line 71 with the opposite side 72 of the main power source.

The general operation of the position sensing mechanism will now be apparent with reference to the diagrammatic showing of Fig. 1. Thus, whenever both pairs of contacts 36, 38 and 37, 39 are closed, relay 45 is energized and maintains switch 47 in open position so that motor 15 is stationary. Placing an object to be weighed on scale pan 10, however, causes main lever 11 to be depressed to an extent which, as governed by the strength of spring 13, corresponds to the weight of the object to be weighed. Such depressing of main lever 11 separates contacts 37 and 39, thereby de-energizing both relays 45 and 46 to allow springs 48 and 51 to close switch 47 and move reversing switch 50 into the upper position. Such action starts motor 15 to drive screw 20 in a direction of rotation such that carriage 30 is lowered to hunt for depressed lever 11.

With contacts 37 and 39 separated, the resilient nature of arm 35 biases contacts 36 and 38 into closed position. Accordingly, motor 15 rotates screw 20 to lower carriage 30 until contacts 37 and 39 meet, at which time the closing of these contacts de-energizes relay 45 stopping motor 15.

Since the depressed position of main lever 11, because of the calibration or correlation of lever 11 and spring 13, is proportional to the weight of an object placed on pan 10, so also the vertical positioning of carriage 30 is proportional to the weight of such object when carriage 30 is in such relative positioning with respect to main lever 11 that contacts 37 and 39 are barely closed. Because the vertical positioning of carriage 30 is adjusted by threaded engagement with screw 20, such vertical positioning is directly proportional to the number of rotations of screw 20. Therefore, the scale register or weight indicating means 22, or other working element, can be directly driven and calibrated to read a weight, cost, or other data from screw 20 according to the number of rotations through which screw 20 was driven by motor 15 from the time the motor was started by the opening of contacts 37 and 39 until carriage 30 was lowered sufficiently to follow main lever 11 to close contacts 37 and 39 and stop motor 15.

When an object being weighed is removed from weighing platform 10, main lever 11 will, of course, rise under the action of spring 13 to its zero position. Such action causes contact 39 to raise resilient arm 35 on carriage 30, thereby opening contacts 36 and 38. Opening these contacts de-energizes relay 45 and allows spring 48 to close switch 47 and start motor 15. Since contacts 37 and 39 are still closed, however, relay 46 is energized, thereby holding reversing switch 50 into the lower position diagrammed in Fig. 1. Thus the field winding 17 of motor 15 is reversed and, when motor 15 starts, it rotates in the opposite direction, driving screw 20 in a direction to raise carriage 30 sufficiently for contact 38 to reach a closed position with contact 36, at which point relay 45 is energized to open switch 47 and stop motor 15. Such reverse rotation of screw 20 is utilized to drive scale register 22 back to a zero position.

It will thus be seen that, for any given position of main lever 11 within the extremes of its limited vertical movement, carriage 30 will be raised or lowered, by the action of motor 15 rotating screw 20, until both sets of contacts 36, 38 and 37, 39 are closed, the direction being determined by whether relay 46 is energized or de-energized to maintain reversing switch 50 in the lower or upper position. If only contacts 37, 39 are open, switch 50 will be in the upper position in the diagram of Fig. 1 and field winding 17 of motor 15 will be such as to cause rotation of the motor and screw 20 to lower carriage 30. If, on the other hand, only contacts 36, 38 are open, relay 46 will be energized to hold reversing switch 50 in the lower position of diagram to cause motor 15 to rotate screw 20 in a direction which will raise carriage 30. In either case, the vertical positioning in which carriage 30 will come to rest is dependent upon the vertical position of lever 11, and, because of the threaded engagement with screw 20 is a function of the number of times screw 20 rotates during movement of carriage 30.

Thus the vertical positioning of lever 11, being proportional to the weight of an object on platform 10 is directly translatable mechanically through the vertical positioning of carriage 30 and the number of rotations of screw 20 to the scale registering mechanism 22. As will also be understood, such positioning of carriage 30 is also translatable electrically to scale registering mechanism 22 and/or to another working element such as a valve to be opened or closed mechanically or electrically or an electrical device to be energized or de-energized or reversed, through the medium of relays such as 45 and 46 in the same manner that the energizing current and field polarity of motor 15 is controlled, actuated, and determined by the positioning of carriage 30 with respect to lever 11 and the open or closed condition of either or both of the sets of contacts 36, 38 and 37, 39.

The foregoing discussion having related primarily the diagrammatic showing of Fig. 1, one satisfactory mechanical construction for a position sensing mechanism embodying this invention will now be described in more detail with reference to Figs. 2 and 3.

Referring to the drawing, a carriage 30 is illustrated as being mounted on a support rod 80 by means of brackets 81 providing for free sliding movement of carriage 30 along rod 80. The lead screw 20 is threadably engaged with carriage 30 to provide for positive movement of the carriage along rod 80 upon rotation of screw 20. Carriage 30 carries a U-shaped bracket member 85 which straddles the carriage 30 and has its opposite ends pivotally mounted on carriage 30 at 86 for pivoted vertical movement of bracket 85 with respect to carriage 30. Adjacent the opposite end of bracket 85 is a rod 87 from which pivotally depends a linkage 90 the lower end of which carries a yoke 91 attached to main scale lever 11 by a pivot pin 92, thus providing for raising or lowering of bracket 85 about its pivots 86 upon relative movement of lever 11 with respect to carriage 30.

Bracket 85 also carries, at its movable end, contact 39 shown in Fig. 2 as being carried by a screw 95 threadably engaged with bracket 85 at 96 and having a nut 97 to provide for vertical adjustment of contact 39. Carriage 30 also carries fixed contact 38, shown in Fig. 3 as being mounted on a screw 100 threadably engaged with a fixed bracket 101 on carriage 30 and having an adjusting nut 102 for vertical adjustment of contact 38.

Near the top of carriage 30 is mounted on fixed bracket 105 a resilient arm 35 on which are mounted contacts 36 and 37. Arm 35 is affixed to bracket 105 as by means of bolt 106, and bracket 105 also carries adjusting bolt 107 the end of which bears against resilient arm 105 for the purpose of adjusting the tension thereof.

It will thus be seen that the construction just described provides an illustrative mechanical embodiment of the position sensing mechanism diagrammed in Fig. 1 and that, upon vertical movement of lever 11 with respect to carriage 30, pivot arm 85 on carriage 30 will be raised or lowered thereby opening or closing one or both of the sets of contacts 36, 38 or 37, 39 as heretofore explained with reference to the Fig. 1 diagram.

In addition to the structure heretofore described, however, it may be desired, in some applications where the initial movement of lever 11 is quite substantial with respect to the dimensions of the apparatus, to provide some mechanical limitation of the maximum extent of movement of the pairs of contacts 36, 38 and 37, 39. Such limiting is illustrated in Fig. 2 as including an extension 110 at one end of pin 92 pivotally interconnecting lever 11 with yoke 91. This extension 110 extends within an oversize hole 111 in a bracket 112 affixed to the bottom of carriage 30. Thus, substantial vertical movement in either direction of lever 11 will be limited by pin 92 striking either the upper or lower edges of hole 111 of bracket 112 until such time as motor 15 can raise or lower carriage 30 to within close proximity of the balance point of lever 11, thus eliminating the danger that an initial movement of lever 11 will be sufficiently gross to move pivoted bracket 85 on carriage 30 enough to permanently bend or deform resilient arm 35.

Similarly, particularly in applications where the initial extent of movement is quite substantial, a separate gross movement motor circuit may be provided (for example, as disclosed in the aforementioned copending application Serial No. 376,136) to move carriage 30 quickly to the vicinity of the balance point of lever 11 where the final fine adjustment of the vertical positioning of carriage 30 is accomplished as described in connection with Fig. 1. Such gross or rapid movement is illustrated in Fig. 2 as being controlled by fixed contacts 115 and 116 determining movement in either an up or down direction depending upon whether they are in open or closed relation with cooperating contacts 117 and 118 flexibly mounted by means of leaves 119 and 120 on pivoted bracket 85 in a manner as is well understood in this art.

It will accordingly be seen that the mechanical structure illustrated in Figs. 2 and 3 is one embodiment of the position sensing device diagrammed in Fig. 1 and provides satisfactory structure for the movable carriage 30 and its appertaining electrical contacts to seek and sense the vertical positioning of a movable member such as lever 11 so that the vertical positioning of carriage 30, relative to the position of lever 11, is mechanically or electrically translated to a working element of the device such as a weight or level indicator or a control device or other apparatus the operation of which it is intended to correlate with the position of a movable member such as scale lever 11.

As heretofore described, carriage 30 is only at rest when in a certain relative positioning with respect to lever 11 such that both sets of contacts 36, 38 and 37, 39 are closed, and any relative movement between lever 11 and carriage 30, for any given position thereof, will cause opening of one or the other of these sets of contacts to cause carriage 30 to reestablish itself in the predetermined relative position with respect to lever 11 at the new position of lever 11. Whereas, in the foregoing description, the operation was described as applied to placing an object on platform 10 and then removing the object, it will be understood that substantially the same mode of operation obtains for any cause of relative movement between lever 11 and carriage 30. That is, carriage 30 will seek and find the position of lever 11 regardless of which direction it may move and the sequence of changes of direction or position thereof. Also, should carriage 30 overshoot the position of lever 11 in either direction, it will immediately correct itself until such time as it reaches its predetermined relative position with respect to lever 11 as determined by both sets of contacts 36, 38 and 37, 39 being in closed position. It will also be understood that the sensitivity or latitude of movement of the device illustrated may be adjusted within broad limits by coordinating and adjusting the tension or flexibility of resilient arm 35 and the force with which it is biased downwardly toward contacts 38 and 39, as well as the individual vertical positioning of contacts 38 and 39 with respect to contacts 36 and 37.

As will be understood with devices which depend upon the simultaneous closing of a plurality of contacts, some variation in sensitivity may be noted by reason of inevitable thermally induced dimensional variations of the contacts or the supports therefor or because of actual transfer of material at the contact points. To avoid the necessity for frequent readjustment due to causes such as these, arm 35 is made of a resilient or spring material and tension adjusting bolt 107 is provided. Satisfactory results have been obtained with screw 100 and bolt 107 so adjusted that, with lever 11 in its zero position, contacts 36 and 38 just barely meet. Then, with screw 95 adjusted so that contact 39 is at substantially the same height as contact 38, bolt 107 is tightened to increase the downward tension of resilient arm 35 a substantial extent.

With such adjustment providing a definite increased tension biasing arm 35 downwardly, the length of time during which both sets of contacts 37, 39 and 36, 38 remain closed after having become closed is sufficient for motor 15 to come to a stop and avoid constant hunting or oscillation of carriage 30.

That is, with substantial downward tension of arm 35 against which contact 39 must act before lifting arm 35 enough to open contacts 36, 38, both sets of contacts will remain closed for a greater degree of displacement from the reference position than if arm 35 were freely pivoted without any downward bias. There may even be some actual downward bowing or deflection of arm 35 to provide an area of movement through which contact 39 must raise contact 37 before opening contacts 36, 38. But, whether it be because of actual deflection or increased tension or both, providing a substantial downward bias on arm 35 has given satisfactory results assuring a broad enough interval of contact when both sets of contacts are closed to permit motor 15 to stop and avoid continuing oscillation of carriage 30 adjacent the balance point of lever 11.

It should also be noted that, because both contacts 37 and 36 are on a moving arm and act on the same side of that arm to engage their cooperating contacts, the precision or sensitivity of engagement is not particularly controlled by whether the top surfaces of contacts 38 and 39 are precisely at the same height, thus giving further operational latitude and freedom from the requirement of frequent adjustment due to dimensional variations, wear, etc. That is, some slight variation in the respective heights of contacts 38 and 39 at the rest position may cause some minor variation in the zero point of scale register 22, but has no noticeable adverse effect on the sensitivity of the hunting and sensing action of carriage 30 to arrive at its rest point with both sets of contacts closed.

Thus simple and economical positioning sensing and control apparatus is provided according to the invention with fully automatic operation to seek and sense the positioning of a movable member and provide a mechanical or electrical output directly translatable mechanically or electrically to an indicating, registering, or control element the actuation or operation of which it is desired to make dependent upon the particular positioning of a movable member.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. A follow-up control for following the movements of an element independently movable in two directions, comprising a follow-up carriage associated with said element, first and second contact members facing in the same direction and spaced from each other, a bridging member adapted to bridge said contact members and capable of movement with respect to either thereof while maintaining engagement with the other thereof, means mounting one of said contact and bridging members on said carriage and another for movement by said element with respect to said carriage, mounting means for the third of said members in fixed relation with one of the other two said members, reversible drive means for driving said carriage, means responsive to bridging engagement of said bridging member with both said contact members for stopping said drive means, means for establishing said bridging engagement of said members only when said carriage is in a predetermined reference position with respect to said element, means responsive to movement of said element in the first of said directions from said reference position for causing separating movement of said bridging member from said second contact member while maintaining engagement of said bridging member with said first contact member, means responsive to said separation of said bridging member from said second contact member for causing said drive means to drive said carriage in said first direction, means responsive to movement of said element in the second of said directions from said reference position for causing separating movement of said bridging member from said first contact member while maintaining engagement of said bridging member with said second contact member, and means responsive to said separation of said bridging member from said first contact member for causing said drive means to drive said carriage in said second direction.

2. A follow-up control for following the movements of an element independently movable in two directions, comprising a follow-up carriage associated with said element, first and second contact members facing in the same direction and spaced from each other, a bridging member adapted to bridge said contact members, means for mounting two of said members on said carriage and the third thereof for movement with respect to said carriage by said element, reversible drive means for driving said carriage, means responsive to bridging engagement of said bridging member with both said contact members for stopping said drive means, means for establishing said bridging engagement of said members only when said carriage is in a predetermined reference position with respect to said element, means for causing said drive means to drive said carriage in one or the other of said directions when said bridging member is in engagement with only one or the other of said contact members, means responsive to movement of said element in said one direction from said reference position for causing said movable member to separate said bridging member from said second contact member while maintaining engagement of said bridging member and said first contact member to actuate said drive means in said one direction, and means responsive to movement of said element in said other direction from said reference position for causing said movable member to separate said bridging member from said first contact member while maintaining engagement of said bridging member and said second contact member to actuate said drive means in said other direction.

3. A follow-up control for following the movements of an element independently movable in two directions, comprising a follow-up carriage associated with said element, first and second contact members facing in the same direction and spaced from each other, a bridging member adapted to bridge said contact members and capable of movement with respect to either thereof while maintaining engagement with the other thereof, means for mounting two of said members on said carriage and the third thereof for movement with respect to said carriage by said element, reversible drive means for driving said carriage, means responsive to bridging engagement of said bridging member with both said contact members for stopping said drive means, means for establishing said bridging engagement of said members only when said carriage is in a predetermined reference position with respect to said element, means responsive to movement of said element in the first of said directions from said reference position for causing movement of said movable member separating said bridging member from said second contact member while maintaining engagement of said bridging member with said first contact member, means responsive to said separation of said bridging member from said second contact member for causing said drive means to drive said carriage in said first direction, means responsive to movement of said element in the second of said directions from said reference position for causing movement of said movable member separating said bridging member from said first contact member while maintaining engagement of said bridging member with said second contact member, and means responsive to said separation of said bridging member from said first members for causing said drive means to drive said carriage in said second direction.

4. A follow-up control for following the movements of an element independently movable in two directions, comprising a follow-up carriage associated with said element, first and second contact members facing in the same direction and spaced from each other, a bridging member adapted to bridge said contact members and capable of movement with respect to either thereof while maintaining engagement with the other thereof, means mounting said first contact member in fixed position on said carriage, means for mounting the remaining two said members one on said carriage and the other for movement with respect to said carriage by said element, reversible drive means for driving said carriage, means responsive to bridging engagement of said bridging member with both said contact members for stopping said drive means, means for establishing said bridging engagement of said members only when said carriage is in a predetermined reference position with respect to said element, means responsive to movement of said element in the first of said directions from said reference position for causing relative movement of said bridging member and said second contact member in opposite directions while maintaining engagement of said bridging member with said first contact member, means responsive to said relative movement of said members for causing said drive means to drive said carriage in said first direction, means responsive to movement of said element in the second of said directions from said reference position for causing said bridging member to move conjointly in maintained engagement with said second contact member with respect to said first contact member, and means responsive to said last named relative movement of said members for causing said drive means to drive said carriage in said second direction.

5. A follow-up control for following the movements of an element independently movable in two directions, comprising a follow-up carriage associated with said element, first and second contact members facing in the same direction and spaced from each other, a bridging member adapted to bridge said contact members, means for mounting two of said members on said carriage and the third thereof for movement with respect to said carriage by said element, means connecting said bridging member to said mounting means therefor at one end thereof for shifting movement with respect to both of said contact members, reversible drive means for driving said carriage, means responsive to bridging engagement of said bridging member with both said contact members for stopping said drive means, means for establishing said bridging engagement of said members only when said carriage is in a predetermined reference position with respect to said element, means responsive to movement of said element in the first of said directions from said reference position for causing relative movement of said second contact member and said bridging member mounting means in the direction to shift said bridging member out of engagement with said first contact member, means responsive to said shifting of said bridging member for causing said drive means to drive said carriage in said first direction, means responsive to movement of said element in the second of said directions from said reference position for causing relative movement of said second contact member and said bridging member mounting means in the direction to separate said bridging member and said second contact member while leaving said bridging member engaged with said first contact member, and means responsive to said last named relative movement of said members for causing said drive means to drive said carriage in said second direction.

6. A follow-up control for following the movements of an element independently movable in two directions, comprising a follow-up carriage associated with said element, first and second contact members facing in the same direction and spaced from each other, a bridging member adapted to bridge said contact members, means for mounting one of said contact members in fixed position on said carriage and the other for movement with respect to said carriage by said element, means for mounting said bridging member on said carriage at one end thereof for deflection with respect to said fixed contact member, reversible drive means for driving said carriage, means responsive to bridging engagement of said bridging member with both said contact members for stopping said drive means, means for establishing said bridging engagement of said members only when said carriage is in a predetermined reference position with respect to said element, means responsive to movement of said element in one of said directions from said reference position for causing said movable contact member to deflect said bridging member out of engagement with said fixed contact member and thereby to actuate said drive means to drive said carriage in said one direction, and means responsive to movement of said element in the second of said directions from said reference position for causing said movable contact member to separate from said bridging member while leaving said bridging member in engagement with said fixed contact member and thereby to actuate said drive means to drive said carriage in said second direction.

7. A follow-up control for following the movements of an element independently movable in two directions, comprising a follow-up carriage associated with said element, first and second contact members facing in the same direction and spaced from each other, a bridging member adapted to bridge said contact members, means for mounting one of said contact members in fixed position on said carriage, an arm pivoted on said carriage and supporting the other said contact member for movement with respect to said carriage, means connecting said arm to said element for movement thereby, means for mounting said bridging member on said carriage at one end thereof for deflection with respect to said fixed contact member, reversible drive means for driving said carriage, means responsive to bridging engagement of said bridging member with both said contact members for stopping said drive means, means for establishing said bridging engagement of said members only when said carriage is in a predetermined reference position with respect to said element, means responsive to movement of said element in one of said directions from said reference position for causing said movable contact member to deflect said bridging member out of engagement with said fixed contact member and thereby to actuate said drive means to drive said carriage in said one direction, and means responsive to movement of said element in the second of said directions from said reference position for causing said movable contact member to separate from said bridging member while leaving said bridging member in engagement with said fixed contact member and thereby to actuate said drive means to drive said carriage in said second direction.

8. A follow-up control for following the movements of an element independently movable in two directions, comprising a follow-up carriage associated with said element, first and second contact members facing in the same direction and spaced from each other, a bridging member adapted to bridge said contact members, means for mounting two of said members on said carriage and the third thereof for movement with respect to said carriage by said element, reversible drive means for driving said carriage, means responsive to bridging engagement of said bridging member with both said contact members for stopping said drive means, means for establishing said bridging engagement of said members only when said carriage is in a predetermined reference position with respect to said element, one of said members including means for exerting a biasing force thereon in the direction to cause engagement between said bridging member and one of said contact members, means for adjusting said biasing force to maintain said bridging engagement of said members over a predetermined limited range of movement of said element from said reference position, means for causing said drive means to drive said carriage in one or the other of said directions when said bridging member is in engagement with only one or the other of said contact members, means responsive to movement of said element in said one direction beyond said range for causing said movable member to separate said bridging member from said second contact member while maintaining engagement of said bridging member and said first contact member to actuate said drive means in said one direction, and means responsive to movement of said element in said other direction beyond said range for causing said movable member to separate said bridging member from said first contact member while maintaining engagement of said bridging member and said second contact member to actuate said drive means in said other direction.

9. A follow-up control for following the movements of an element independently movable in two directions, comprising a follow-up carriage associated with said element, first and second contact members facing in the same direction and spaced from each other, a bridging member adapted to bridge said contact members, means for mounting two of said members on said carriage and the third thereof for movement with respect to said carriage by said element, said bridging member including a resilient arm mounted at one end thereof for deflection with respect to both of said contact members, reversible drive means for driving said carriage, means responsive to bridging engagement of said bridging memebr with both said contact members for stopping said drive means, means for establishing said bridging engagement of said members only when said carriage is in a predetermined reference position with respect to said element, adjustable means for tensioning said arm in the direction to maintain engagement of said bridging member with both of said contact members over a predetermined limited range of movement of said element from said reference position, means for causing said drive means to drive said carriage in one or the other of said directions when said bridging member is in engagement with only one or the other of said contact members, means responsive to movement of said element in said one direction beyond said range for causing deflection of said bridging member about said second contact members and out of engagement with said first contact member, and means responsive to movement of said element in said other direction beyond said range for causing separation of said bridging member and said second contact member while leaving said bridging member engaged with said first contact member.

10. A follow-up control for following the movements of an element independently movable in two directions, comprising a follow-up carriage associated with said element, first and second contact members facing in the same direction and spaced from each other, a bridging member adapted to bridge said contact members, means for mounting first said contact member and said bridging member on said carriage and said second contact member for movement with respect to said carriage by said element, reversible drive means for driving said carriage, means responsive to bridging engagement of said bridging member with both said contact members for stopping said drive means, means for establishing said bridging engagement of said members only when said carriage is in a predetermined reference position with respect to said element, said bridging member including a resilient arm, adjustable means for tensioning said arm toward said first contact member to maintain said bridging engagement of said members over a predetermined limited range of movement of said element from said reference position, means for causing said drive means to drive said carriage in one or the other of said directions when said bridging member is in engagement with only one or the other of said contact members, means responsive to movement of said element in said one direction beyond said range for causing said movable contact member to separate said bridging member from said second contact member while maintaining engagement with said bridging member to actuate said drive means in said one direction, and means responsive to movement of said element in said other direction beyond said range for causing said movable contact member to separate from said bridging member while maintaining engagement of said bridging member and said second contact member to actuate said drive means in said other direction.

References Cited in the file of this patent

UNITED STATES PATENTS

| | | |
|---|---|---|
| 1,731,776 | Henry | Oct. 15, 1929 |
| 2,040,072 | Brendel | May 12, 1936 |

FOREIGN PATENTS

| | | |
|---|---|---|
| 388,536 | Great Britain | Mar. 2, 1933 |